US012567170B2

(12) United States Patent
Guizilini et al.

(10) Patent No.: US 12,567,170 B2
(45) Date of Patent: Mar. 3, 2026

(54) PRODUCING A DEPTH MAP FROM TWO-DIMENSIONAL IMAGES

(71) Applicant: Toyota Research Institute, Inc., Los Altos, CA (US)

(72) Inventors: Vitor Guizilini, Santa Clara, CA (US); Rares A. Ambrus, San Francisco, CA (US); Dian Chen, Mountain View, CA (US); Adrien David Gaidon, Mountain View, CA (US); Sergey Zakharov, San Francisco, CA (US)

(73) Assignees: Toyota Research Institute, Inc., Los Altos, CA (US); Toyota Jidosha Kabushiki Kaisha, Toyota (JP)

( * ) Notice: Subject to any disclaimer, the term of this patent is extended or adjusted under 35 U.S.C. 154(b) by 769 days.

(21) Appl. No.: 17/879,186

(22) Filed: Aug. 2, 2022

(65) Prior Publication Data

US 2023/0154038 A1 May 18, 2023

Related U.S. Application Data

(60) Provisional application No. 63/279,823, filed on Nov. 16, 2021, provisional application No. 63/279,404, filed on Nov. 15, 2021.

(51) Int. Cl.
| | |
|---|---|
| *G06T 7/73* | (2017.01) |
| *G06T 7/55* | (2017.01) |
| *G06T 7/593* | (2017.01) |

(52) U.S. Cl.
CPC .................. *G06T 7/73* (2017.01); *G06T 7/55* (2017.01); *G06T 7/593* (2017.01); (Continued)

(58) Field of Classification Search
CPC .............. G06T 7/73; G06T 7/55; G06T 7/593
See application file for complete search history.

(56) References Cited

U.S. PATENT DOCUMENTS

| | | | |
|---|---|---|---|
| 8,619,082 B1 * | 12/2013 | Ciurea ................... | H04N 23/16 382/154 |
| 2014/0219549 A1 * | 8/2014 | Choi ...................... | G06T 7/593 382/154 |

(Continued)

FOREIGN PATENT DOCUMENTS

| | | |
|---|---|---|
| CN | 109554559 A | 4/2019 |
| CN | 110120049 A | 8/2019 |

OTHER PUBLICATIONS

Wang et al. "Deep Visual Domain Adaptation: A Survey," Neurocomputing, vol. 312, No. 27, pp. 135-153, 2018.

(Continued)

*Primary Examiner* — Margaret G Webb
(74) *Attorney, Agent, or Firm* — Christopher G. Darrow; Darrow Mustafa PC

(57) ABSTRACT

A system for producing a depth map can include a processor and a memory. The memory can store a candidate depth production module and a depth map production module. The candidate depth production module can include instructions that cause the processor to: (1) identify, in a first image, an epipolar line associated with a pixel in a second image and (2) sample, from a first image feature set, a set of candidate depths for pixels along the epipolar line. The depth map production module can include instructions that cause the processor to: (1) determine a similarity measure between a feature, from a second image feature set, and a member of the set and (2) produce, from the second image, the depth map with a depth for the pixel being a depth associated with a member, of the set, having a greatest similarity measure.

20 Claims, 7 Drawing Sheets

(52) U.S. Cl.

CPC ............... *G06T 2207/10012* (2013.01); *G06T 2207/10028* (2013.01); *G06T 2207/20076* (2013.01); *G06T 2207/20081* (2013.01); *G06T 2207/20084* (2013.01)

(56) References Cited

U.S. PATENT DOCUMENTS

| | | | |
|---|---|---|---|
| 2018/0020205 A1* | 1/2018 | Aflalo | H04N 13/271 |
| 2019/0080464 A1* | 3/2019 | Lee | G06T 7/33 |
| 2019/0347538 A1 | 11/2019 | Lee et al. | |
| 2020/0372660 A1 | 11/2020 | Li et al. | |
| 2021/0150252 A1* | 5/2021 | Sarlin | G06N 3/09 |

OTHER PUBLICATIONS

Islam et al., "A new algorithm to design compact two-hidden-layer artificial neural networks," Neural Networks, vol. 14, No. 9, pp. 1265-1278, 2001.

Watson et al., "The Temporal Opportunist: Self-Supervised Multi-Frame Monocular Depth," 2021 IEEE/CVF Conference on Computer Vision and Pattern Recognition (CVPR), pp. 1164-1174, 2021.

Isikodogan et al., "SemifreddoNets: Partially Frozen Neural Networks for Efficient Computer Vision Systems," Retrieved from arxiv.org/abs/2006.06888.v1 [cs.CV] Jun. 12, 2020 pp. 1-16.

Zhao et al., "Monocular Depth Estimation Based on Deep Learning: An Overview," Sci. China Technol. Sci. No. 63, pp. 1612-1627, 2020. Retrieved from: arXiv:2003.06620v1 [cs.CV] Mar. 14, 2020.

Evain et al., "A Lightweight Neural Network for Monocular View Generation with Occlusion Handling," IEEE Transactions on Pattern Analysis & Machine Intelligence, vol. 43, No. 6, pp. 1832-1844, 2021. Retrieved from: arXiv:2007.12577v1 [cs.CV] Jul. 24, 2020.

Guizilini et al., "Geometric Unsupervised Domain Adaptation for Semantic Segmentation," Retrieved from arXiv:2103.16694v2 [cs.CV] Aug. 18, 2021, pp. 1-15.

Antequera et al., "Mapillary Planet-Scale Depth Dataset," In European Conference on Computer Vision, Aug. 23, 2020, pp. 589-604.

Huynh et al., "Guiding Monocular Depth Estimation Using Depth-Attention Volume," In ECCV, Aug. 23-28, 2020, pp. 1-17.

Sadek et al., "Self-Supervised Attention Learning for Depth and Ego-Motion Estimation," 2020 IEEE/RSJ International Conference on Intelligent Robots and Systems (IROS), Retrieved from: arXiv:2004.13077v1 [cs.CV] Apr. 27, 2020, pp. 1-7.

Lee et al., "Patch-wise attention network for monocular depth estimation," Association for the Advancement of Artificial Intelligence Conference, Feb. 2-9, 2021, pp. 1873-1881.

Ranftl et al., "Vision Transformers for Dense Prediction," Retrieved from: arXiv:2103.13413v1 [cs.CV] Mar. 24, 2021, pp. 1-15.

Johnston et al., "Self-supervised Monocular Trained Depth Estimation using Self-attention and Discrete Disparity Volume," CVPR 2020, Computer Vision Foundation, pp. 4756-4765.

Li et al., "Revisiting Stereo Depth Estimation From a Sequence-to-Sequence Perspective with Transformers," Retrieved from: arXiv:2011.02910v4 [cs.CV] Aug. 25, 2021, pp. 1-15.

Ruhkamp et al., "Attention meets Geometry: Geometry Guided Spatial-Temporal Attention for Consistent Self-Supervised Monocular Depth Estimation," Retrieved from: arXiv:2110.08192v1 [cs.CV] Oct. 15, 2021, pp. 1-11.

Im et al., "DPSNet: End-to-end Deep Plane Sweep Stereo," Retrieved from: https://arXiv:1905.00538v1 [cs.CV] May 2, 2019, pp. 1-12.

Wu et al., "Semantic Stereo Matching with Pyramid Cost Volumes," 2019 IEEE/CVF International Conference on Computer Vision (ICCV), 2019, pp. 7484-7493.

Xu et al., "Structured Attention Guided Convolutional Neural Fields for Monocular Depth Estimation," 2018 IEEE/CVF Conference on Computer Vision and Pattern Recognition, Mar. 29, 2018, pp. 3917-3925.

Wimbauer et al., "MonoRec: Semi-Supervised Dense Reconstruction in Dynamic Environments from a Single Moving Camera," In CVPR, 2021, Computer Vision Foundation, pp. 6112-6122.

Unknown, "Attention (machine learning)" last accessed Jun. 7, 2022, 4 pages, found at https://en.wikipedia.org/wiki/Attention_(machine_learning).

Unknown, "Computer vision," last accessed Jun. 19, 2022, 17 pages, found at https://en.wikipedia.org/wiki/Computer_vision.

Unknown, "Construction barrel" last accessed on Mar. 10, 2022, 2 pages, found at https://en.wikipedia.org/wiki/Construction_barrel.

Unknown, "Cost Volume, help Me understand What it is," last accessed Jun. 24, 2022, 13 pages, found at https://www.reddit.com/r/computervision/comments/ap4rbu/cost_volume_help_me_understand_what_it_is/.

Dey et al., "Detection of Independently Moving Objects in Non-planar Scenes via Multi-Frame Monocular Epipolar Constraint," Computer Vision—ECCV 2012, pp. 860-873.

Unknown, "Epipolar geometry," last accessed Jan. 19, 2022, 4 pages, found at https://en.wikipedia.org/wiki/Epipolar_geometry.

Unknown, "Feature (computer vision)" last accessed Jun. 2, 2022, 9 pages, found at https://en.wikipedia.org/wiki/Feature_(computer_vision).

Unknown, "Range imaging," last accessed Oct. 20, 2021, 4 pages, found at https://en.wikipedia.org/wiki/Range_imaging.

Unknown, "Structure from motion," Feb. 8, 2022, 7 pages, found at https://en.wikipedia.org/wiki/Structure_from_motion.

Unknown, "Transformer (machine learning model)," last accessed on Jun. 2, 2022, 8 pages, found at https://en.wikipedia.org/wiki/Transformer_(machine_learning_model).

Petit et al., "U-Net Transformer: Self and Cross Attention for Medical Image Segmentation," Machine Learning in Medical Imaging, Mar. 12, 2021, pp. 267-276.

* cited by examiner

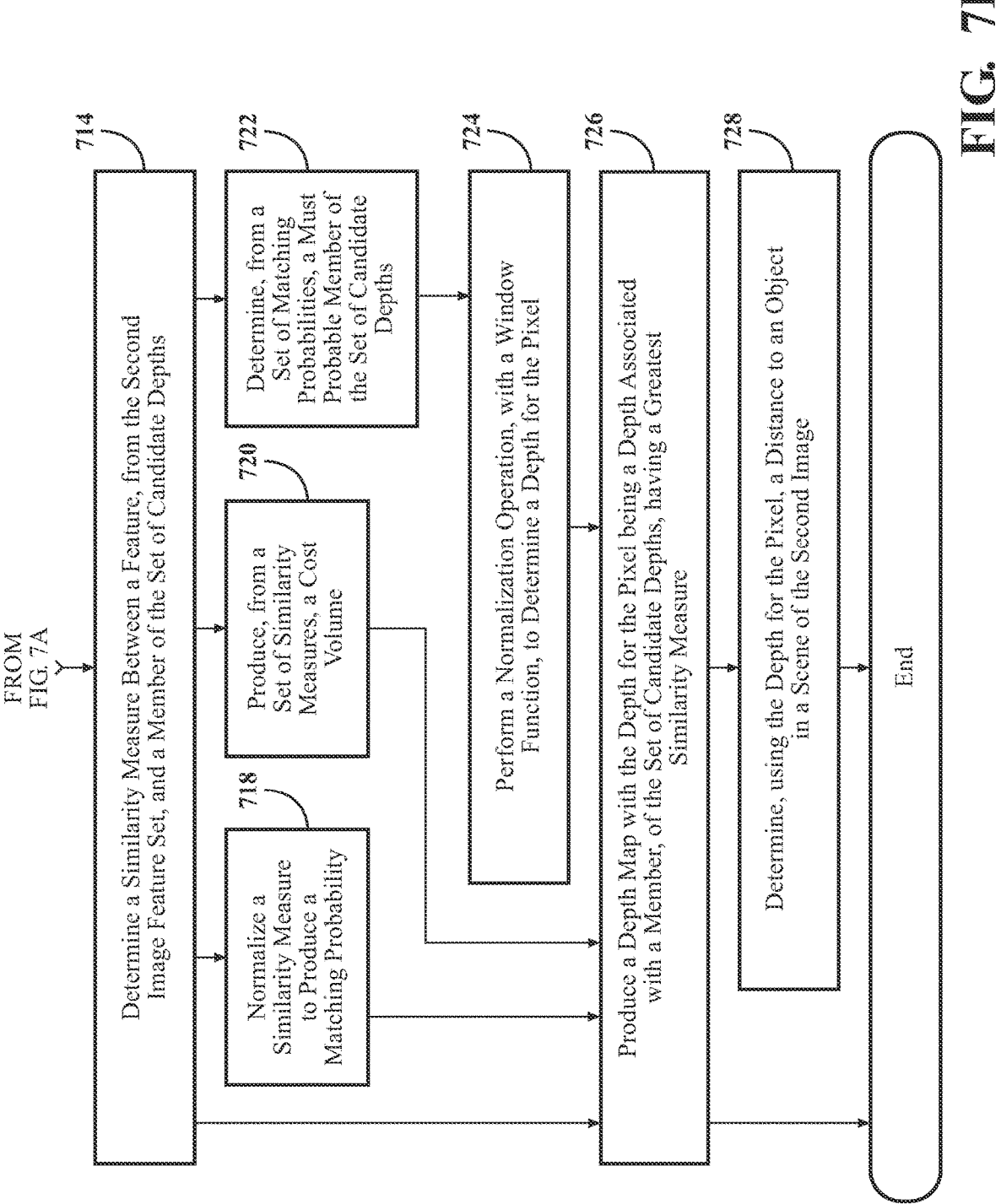

FROM
FIG. 7A

714 — Determine a Similarity Measure Between a Feature, from the Second Image Feature Set, and a Member of the Set of Candidate Depths 718 — Normalize a Similarity Measure to Produce a Matching Probability 720 — Produce, from a Set of Similarity Measures, a Cost Volume 722 — Determine, from a Set of Matching Probabilities, a Must Probable Member of the Set of Candidate Depths 724 — Perform a Normalization Operation, with a Window Function, to Determine a Depth for the Pixel 726 — Produce a Depth Map with the Depth for the Pixel being a Depth Associated with a Member, of the Set of Candidate Depths, having a Greatest Similarity Measure 728 — Determine, using the Depth for the Pixel, a Distance to an Object in a Scene of the Second Image End

PRODUCING A DEPTH MAP FROM TWO-DIMENSIONAL IMAGES

CROSS-REFERENCE TO RELATED APPLICATIONS

This application claims the benefit of U.S. Provisional Application No. 63/279,404, filed Nov. 15, 2021, and U.S. Provisional Application No. 63/279,823, filed Nov. 16, 2021, each of which is incorporated herein in its entirety by reference.

TECHNICAL FIELD

The disclosed technologies are directed to producing a depth map from two-dimensional images.

BACKGROUND

Computer vision tasks can be directed to deriving information from an image. The information can be used to produce a decision with respect to controlling a system supported by the computer vision tasks. For example, the system can be a mobile robot and the computer vision tasks can support navigation of the mobile robot. Often, computer vision tasks can involve detecting or extracting features from the image. Such features can include, for example, identifications of regions of interest, edges, corners, or the like. Computer vision tasks can include, for example, range imaging methods. Range imaging methods can be used to produce a two-dimensional image in which distances to points on objects in a scene, represented by the two-dimensional image, are incorporated into values of pixels that represent the points. Range imaging methods can include, for example, structure-from-motion. Structure-from-motion can be used, for example, to estimate three-dimensional structures from sequences of two-dimensional images. A viewpoint of a first image in a sequence can be different from a viewpoint of a second image in the sequence. Feature matching, between features produced from the first image and features produced from the second image, can be an important technique used to estimate the three-dimensional structures.

SUMMARY

In an embodiment, a system for producing a depth map can include a processor and a memory. The memory can store a candidate depth production module and a depth map production module. The candidate depth production module can include instructions that, when executed by the processor, cause the processor to: (1) identify, in a first image, an epipolar line associated with a pixel in a second image and (2) sample, from a first image feature set, a set of candidate depths for pixels along the epipolar line. The depth map production module can include instructions that, when executed by the processor, cause the processor to: (1) determine a similarity measure between a feature, from a second image feature set, and a member of the set and (2) produce, from the second image, the depth map with a depth for the pixel being a depth associated with a member, of the set, having a greatest similarity measure.

In another embodiment, a method producing a depth map can include identifying, by a processor, in a first image, an epipolar line associated with a pixel in a second image. The method can include sampling, by the processor and from a first image feature set, a set of candidate depths for pixels along the epipolar line. The method can include determining, by the processor, a similarity measure between a feature, from a second image feature set, and a member of the set. The method can include producing, by the processor and from the second image, a depth map with a depth for the pixel being a depth associated with a member, of the set, having a greatest similarity measure.

In another embodiment, a non-transitory computer-readable medium for producing a depth map can include instructions that, when executed by one or more processors, cause the one or more processors to identify, in a first image, an epipolar line associated with a pixel in a second image. The non-transitory computer-readable medium can also include instructions that, when executed by one or more processors, cause the one or more processors to sample, from a first image feature set, a set of candidate depths for pixels along the epipolar line. The non-transitory computer-readable medium can also include instructions that, when executed by one or more processors, cause the one or more processors to determine a similarity measure between a feature, from a second image feature set, and a member of the set. The non-transitory computer-readable medium can also include instructions that, when executed by one or more processors, cause the one or more processors to produce, from the second image, a depth map with a depth for the pixel being a depth associated with a member, of the set, having a greatest similarity measure.

BRIEF DESCRIPTION OF THE DRAWINGS

The accompanying drawings, which are incorporated in and constitute a part of the specification, illustrate various systems, methods, and other embodiments of the disclosure. It will be appreciated that the illustrated element boundaries (e.g., boxes, groups of boxes, or other shapes) in the figures represent one embodiment of the boundaries. In some embodiments, one element may be designed as multiple elements or multiple elements may be designed as one element. In some embodiments, an element shown as an internal component of another element may be implemented as an external component and vice versa. Furthermore, elements may not be drawn to scale.

FIGS. 7A and 7B include a flow diagram that illustrates an example of a method that is associated with producing a depth map, according to the disclosed technologies.

DETAILED DESCRIPTION

The disclosed technologies are directed to producing a depth map from two-dimensional images. A first image of a scene can be produced by a camera. A second image of the scene can be produced by the camera. A viewpoint of the second image can be different from a viewpoint of the first image. For example, the camera can include a stereo camera. Alternatively, for example, the first image can be a first frame in a sequence of frames, the second image can be a second frame in the sequence of frames, and the second frame can be separated from the first frame by a duration of time. For example, during the duration of time a position of the camera, with respect to an object in the scene, can have changed.

In the first image, an epipolar line, associated with a pixel in the second image, can be identified. For example, in the second image, the pixel can represent at least a portion of the object in the scene. From the first image, a first image feature set can be produced. From the second image, a second image feature set can be produced. From the first image feature set, a set of candidate depths for pixels along the epipolar line can be sampled. A similarity measure between a feature, from the second image feature set, and a member, of the set of candidate depths, can be determined. Advantageously, having the set of candidate depths being associated with the epipolar line can improve results of feature matching techniques used to determine a set of similarity measures.

For example, the feature matching techniques can include a first attention technique. The first attention technique (e.g., cross-attention) can be used to determine a first set of similarity measures. For example, the first set of similarity measures can be between the feature, from the second image feature set, and members of the set of candidate depths. For example, the feature matching techniques can further include a second attention technique. The second attention technique (e.g., self-attention) can be used to determine a second set of similarity measures. For example, the second set of similarity measures can be between one member, of the members of the set of candidate depths, and other members of the members of the set of candidate depths.

From the second image, a depth map can be produced. A depth for the pixel, in the depth map, can be a depth associated with a member, of the set of candidate depths, having a greatest similarity measure. For example, using the depth for the pixel, a distance to the object can be determined. For example, the distance can be between the object and the camera.

Figure 1:
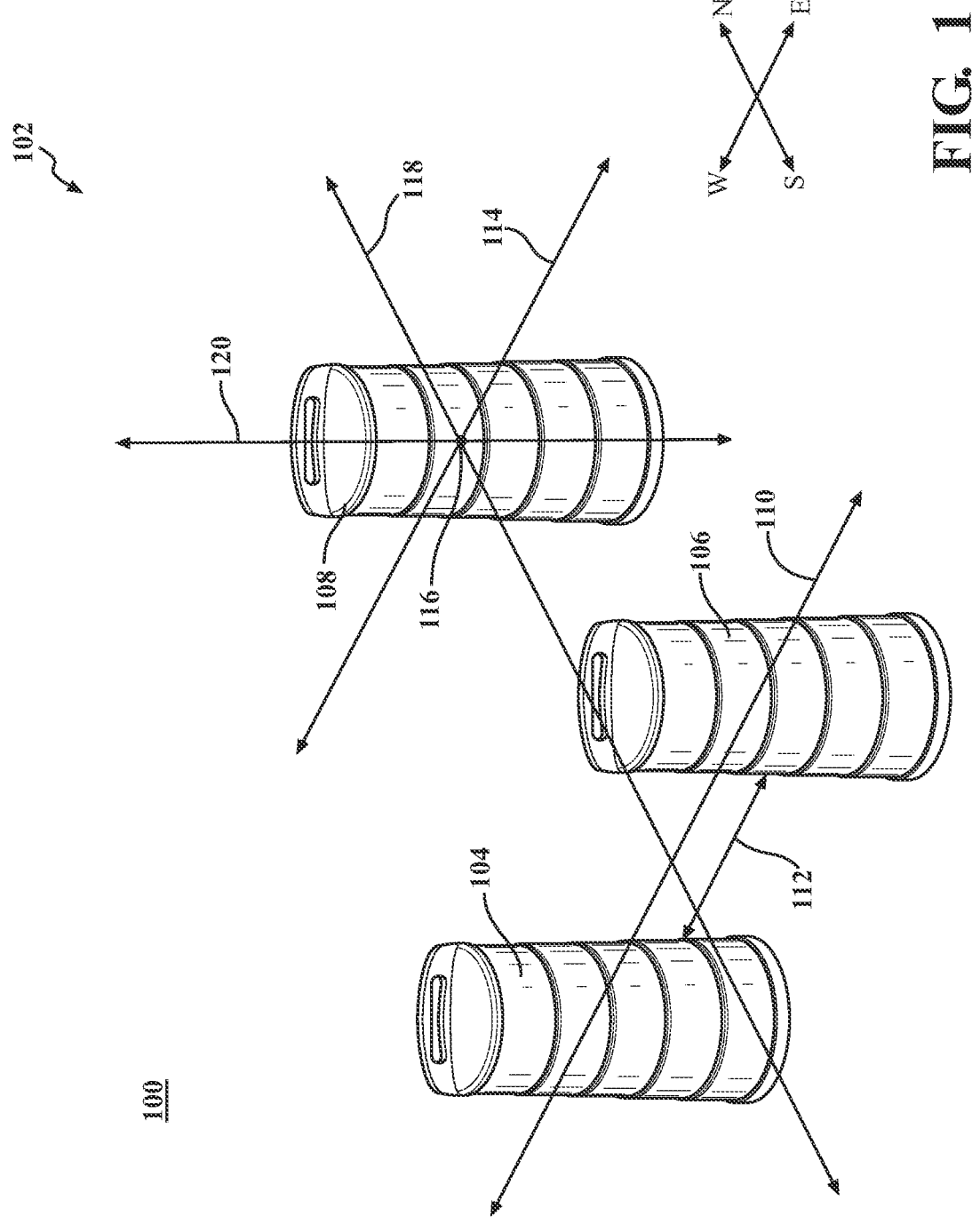
FIG. 1 includes a first diagram of an example of a scene that is useful in illustrating an operation of the disclosed technologies.

FIG. 1 includes a first diagram 100 of an example of a scene 102 that is useful in illustrating an operation of the disclosed technologies. For example, the scene 102 can include a first construction barrel 104, a second construction barrel 106, and a third construction barrel 108.

For example, each of the first construction barrel 104, the second construction barrel 106, and the third construction barrel 108 can be a same color. For example, the first construction barrel 104 and the second construction barrel 106 can be arranged along a first line 110. For example, the first line 110 can be a line of latitude. For example, a space 112 can separate the first construction barrel 104 from the second construction barrel 106. For example, the third construction barrel 108 can be disposed along a second line 114. For example, the second line 114 can be a line of latitude. For example, the third construction barrel 108 can also be at a position 116 along a third line 118 that intersects the space 112. For example, the third line 118 can be a line of longitude. For example, a fourth line 120 can traverse a path from northwest to southeast and can intersect the third construction barrel 108.

Figures 2, 3:
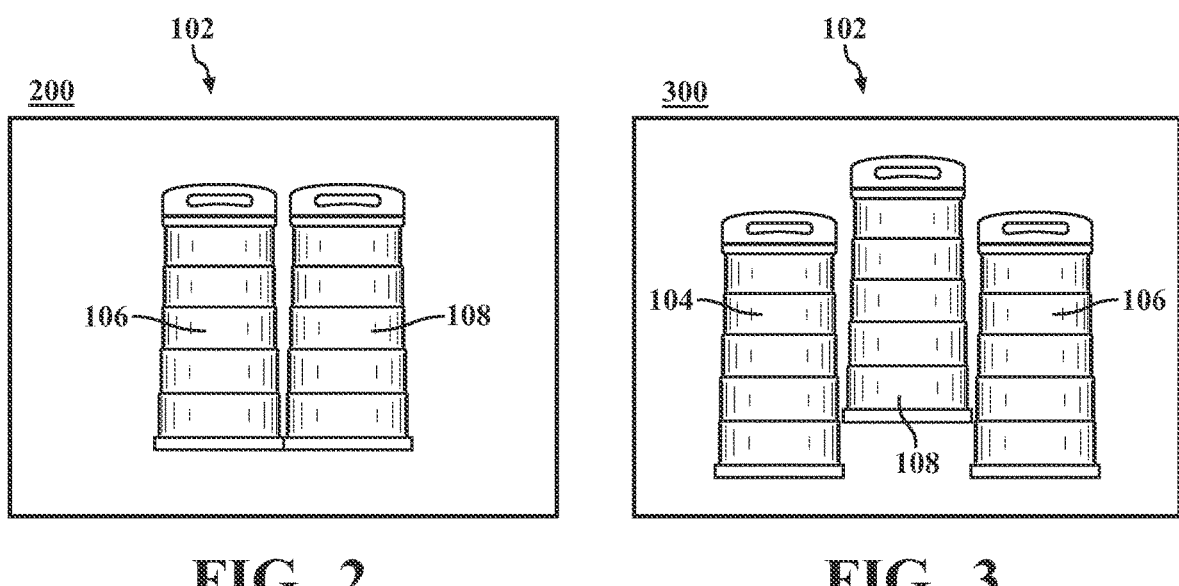
FIG. 2 includes an example of a first image, of the scene, associated with an operation of the disclosed technologies.
FIG. 3 includes an example of a second image, of the scene, associated with an operation of the disclosed technologies.

FIG. 2 includes an example of a first image 200, of the scene 102, associated with an operation of the disclosed technologies. The first image 200 is a two-dimensional image. A viewpoint of the first image 200 can be from a camera (not illustrated) at a position along the fourth line 120 (see FIG. 1) and facing northwest. Because of the viewpoint of the first image 200, a determination, from information from the first image 200, of a difference between a depth of the third construction barrel 108 and a depth of the second construction barrel 106 may be accomplished.

FIG. 3 includes an example of a second image 300, of the scene 102, associated with an operation of the disclosed technologies. The second image 300 is a two-dimensional image. A viewpoint of the second image 300 can be from the camera (not illustrated) at a position along the third line 118 (see FIG. 1) and facing north. Because of the viewpoint of the second image 300 and because the second image 300 is a two-dimensional image, a determination, from information from the second image 300, of a difference between a depth of the third construction barrel 108 and a depth of each of the first construction barrel 104 and the second construction barrel 106 may be difficult to accomplish.

Figure 4:
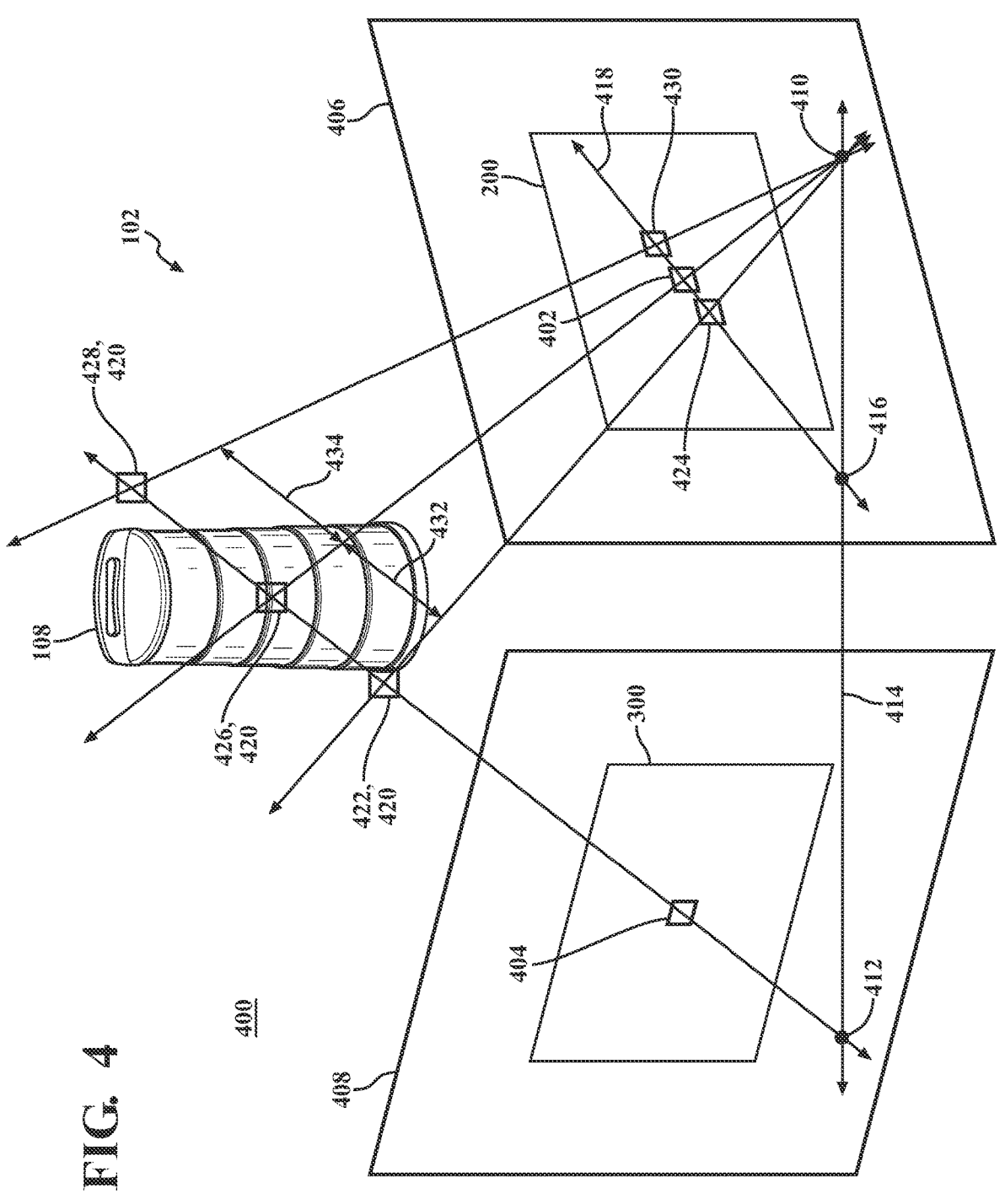
FIG. 4 includes a second diagram of the example of the scene that is useful in illustrating an operation of the disclosed technologies.

FIG. 4 includes a second diagram 400 of the example of the scene 102 that is useful in illustrating an operation of the disclosed technologies. For example, the diagram 400 can include a pixel 402 on the third construction barrel 108 in the first image 200, a corresponding pixel 404 on the third construction barrel 108 in the second image 300, a first plane 406 that includes the first image 200, a second plane 408 that includes the second image 300, a position 410 of the camera (not illustrated) at a production of the first image 200, a position 412 of the camera (not illustrated) at a production of the second image 300, a fifth line 414 that intersects the position 410 and the position 412, a position 416 that intersects the first plane 406 and the fifth line 414, and a sixth line 418 that intersects the position 416 and the pixel 402. The sixth line 418 can be an epipolar line. The epipolar line can be for the corresponding pixel 404. That is, in a situation in which: (1) an object in a scene is included in both a first image and a second image and (2) a viewpoint of the second image is different from a viewpoint of the first image, an epipolar line can define a relationship, with respect to the object, between the first image and the second image. The epipolar line can be disposed in a plane of one image but can be for a position of the object in the other image. The epipolar line can be used to determine a depth, in the scene, of the object in the other image.

Figure 5:
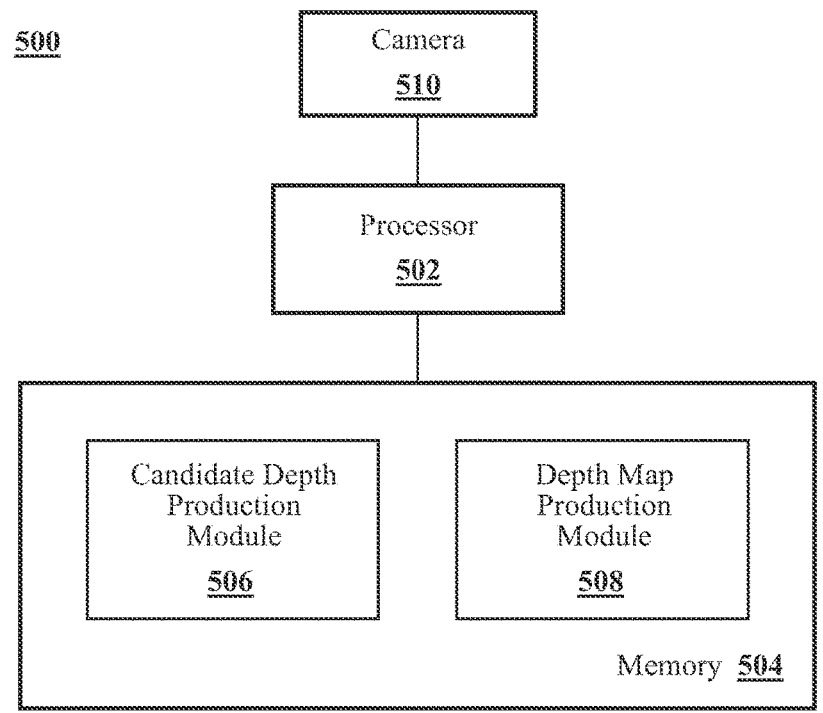
FIG. 5 includes a block diagram that illustrates an example of a system for producing a depth map, according to the disclosed technologies.

FIG. 5 includes a block diagram that illustrates an example of a system 500 for producing a depth map, according to the disclosed technologies. The system 500 can include, for example, a processor 502 and a memory 504. The memory 504 can be communicably coupled to the processor 502. The memory 504 can store, for example, a candidate depth production module 506 and a depth map production module 508. For example, the processor 502 and the memory 504 can be configured to be disposed on a mobile robot. For example, the mobile robot can include an automated vehicle.

For example, the system 500 can further include a camera 510. The camera 510 can be configured to produce a first image and to produce a second image. For example, the first image can be of a scene, the second image can be of the scene, and a viewpoint of the second image can be different from a viewpoint of the first image. For example, the camera 510 can include a stereo camera. Alternatively, for example, the first image can be a first frame in a sequence of frames, the second image can be a second frame in the sequence of frames, and the second frame can be separated from the first frame by a duration of time. For example, during the duration of time a position of the camera 510, with respect to an object in the scene, can have changed.

For example, the candidate depth production module 506 can include instructions that function to control the processor 502 to identify, in the first image, an epipolar line associated with a pixel in the second image. For example, the pixel, in the second image, can represent at least a portion of the object in the scene.

With reference to FIG. 4, for example, the first image can be the first image 200, the second image can be the second image 300, the epipolar line can be the sixth line 418, and the pixel in the second image associated with the epipolar line, can be the corresponding pixel 404. For example, the corresponding pixel 404, in the second image 300, can represent a portion of the third construction barrel 108 in the scene 102.

Returning to FIG. 5, for example, the candidate depth production module 506 can further include instructions that function to control the processor 502 to produce, from the first image, a first image feature set, and to produce, from the second image, a second image feature set. For example, one or more of the first image or the second image can be defined by: (1) a height measured by a first count of pixels, (2) a width measured by a second count of pixels, and (3) a count of color components represented by the pixel. For example, the count of color components represented by the pixel can be three. For example, the color components represented by the pixel can be red, green, and blue. For example, one or more of the first image feature set or the second image feature set can be defined by: (1) a height measured by a third count of pixels, (2) a width measured by a fourth count of pixels, and (3) a count of features associated with the pixel. Additionally, for example, the third count of pixels can be less than the first count of pixels. For example, the third count of pixels can be one quarter of the first count of pixels. Additionally, for example, the fourth count of pixels can be less than the second count of pixels. For example, the fourth count of pixels can be one quarter of the second count of pixels. For example, the count of features associated with the pixel can be a specific number. For example, the specific number can be sixty-four. That is, in a comparison between information included in an image and information included in an image feature set, the information included in the image feature set may be for fewer pixels than the information included in the image, but in the image feature set, the information for a pixel may include information for a large number of features whereas in the image, the information for a pixel may only include information for a few number of color components.

For example, the candidate depth production module 506 can include instructions that function to control the processor 502 to sample, from the first image feature set, a set of candidate depths for pixels along the epipolar line. For example, the set of candidate depths can be defined by: (1) a range of candidate depths from a minimum candidate depth to a maximum candidate depth and (2) a count of members of the set of candidate depths. Additionally, for example, the members of the set of candidate depths can include a first member, a second member, and a third member. For example, the third member can be directly adjacent to the second member. For example, the second member can be directly adjacent to the first member. A first distance can be a distance between the first member and the second member. A second distance can be a distance between the second member and the third member. For example, a relationship between the first distance and the second distance can be a logarithmic relationship. Such a relationship can be referred to as spatial-increasing discretization and can result in uniformly sampled depth values in a logarithmic space.

With reference to FIG. 4, for example, the diagram 400 can further include a set of candidate depths 420 for pixels along the sixth line 418. For example, members of the set of candidate depths 420 can include a first member 422 (associated with a first pixel 424), a second member 426 (associated with the pixel 402), and a third member 428 (associated with a second pixel 430). For example, the set of candidate depths 420 can be defined by: (1) a range of candidate depths from a minimum candidate depth (associated with the first member 422) to a maximum candidate depth (associated with the third member 428) and (2) a count of members of the set of candidate depths 420 (i.e., three). For example, the third member 428 can be directly adjacent to the second member 426. For example, the second member 426 can be directly adjacent to the first member 422. A first distance 432 can be a distance between the first member 422 and the second member 426. A second distance 434 can be a distance between the second member 426 and the third member 428. For example, a relationship between the first distance 432 and the second distance 434 can be a logarithmic relationship.

Figure 6:
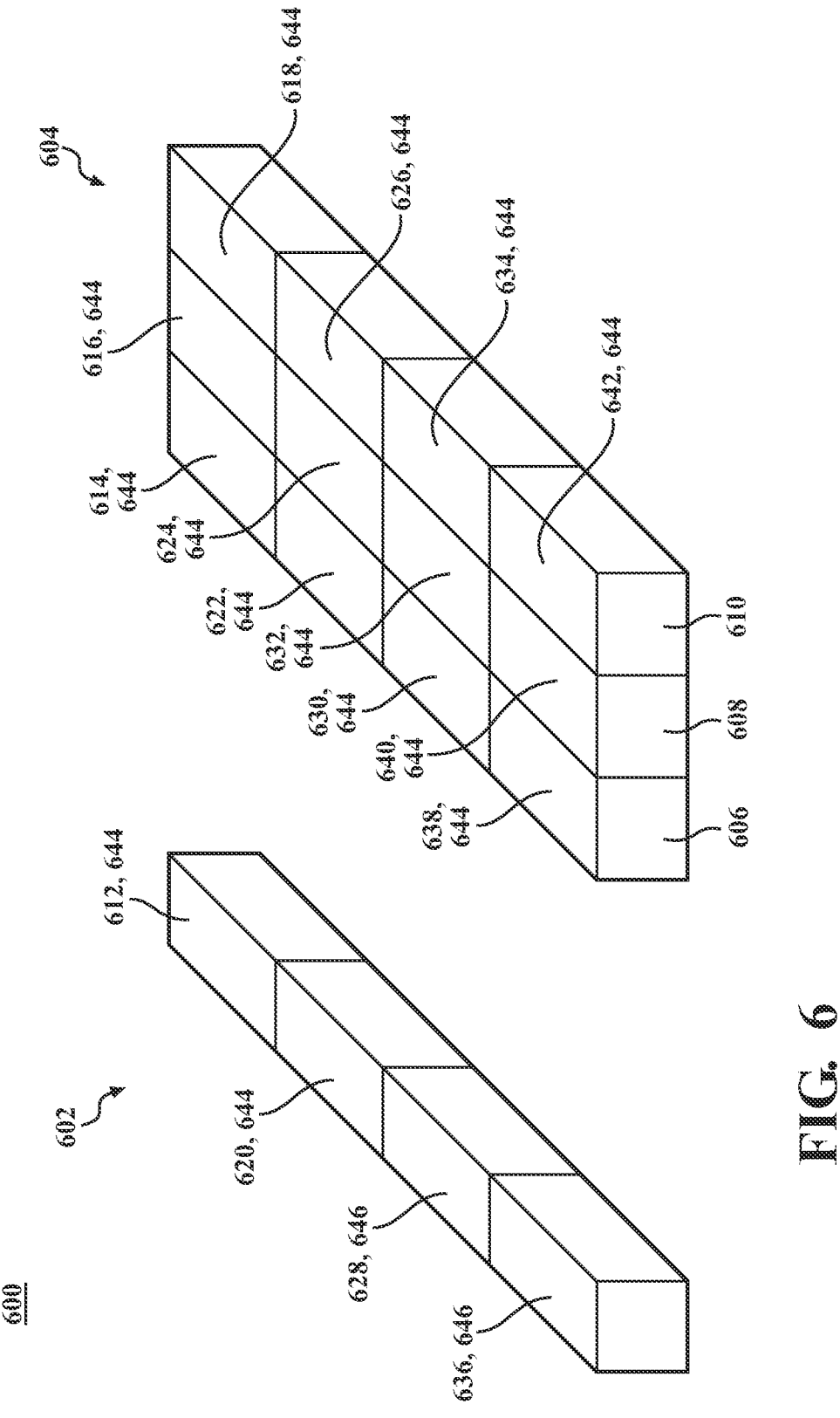
FIG. 6 includes a diagram that illustrates an example of a feature set, for a pixel in the second image, and a set of feature sets for a set of candidate depths associated with a corresponding pixel in the first image.

FIG. 6 includes a diagram 600 that illustrates an example of a feature set 602, for the corresponding pixel 404 in the second image 300, and a set of feature sets 604 for the set of candidate depths 420 associated with the pixel 402 in the first image 200. The feature set 602 (for only the corresponding pixel 404) can be a subset of the second feature set. The set of feature sets 604 can include a first feature set 606 (associated with the first member 422 of the set of candidate depths 420), a second feature set 608 (associated with the second member 426 of the set of candidate depths 420), and a third feature set 610 (associated with the third member 428 of the set of candidate depths 420). Each of the first feature set 606 (for only the first pixel 424), the second feature set 608 (for only the pixel 402), and the third feature set 610 (for only the second pixel 430) can be a subset of the first feature set.

For example, the feature set 602 can include a first feature 612, the first feature set 606 can include a corresponding first feature 614, the second feature set 608 can include a corresponding first feature 616, and the third feature set 610 can include a corresponding first feature 618. For example, the feature set 602 can include a second feature 620, the first feature set 606 can include a corresponding second feature 622, the second feature set 608 can include a corresponding second feature 624, and the third feature set 610 can include a corresponding second feature 626. For example, the feature set 602 can include a third feature 628, the first feature set 606 can include a corresponding third feature 630, the second feature set 608 can include a corresponding third feature 632, and the third feature set 610 can include a corresponding third feature 634. For example, the feature set 602 can include a fourth feature 636, the first feature set 606 can include a corresponding fourth feature 638, the second feature set 608 can include a corresponding fourth feature 640, and the third feature set 610 can include a corresponding fourth feature 642.

Returning to FIG. 5, for example, the depth map production module 508 can include instructions that function to control the processor 502 to determine a similarity measure between a feature, from the second image feature set, and a member of the set of candidate depths. For example, the instructions to determine the similarity measure can include instructions to determine, using an attention technique, a set of similarity measures. In a neural network, an attention technique can operate in a manner that mimics a way in which a human mind pays attention by one or more of enhancing an effect of a first portion of input information or diminishing an effect of a second portion of input information. In the neural network, the attention technique can be realized by a configuration that allows values of weights to be changed during an operation of the neural network.

In an implementation, the instructions to determine the similarity measure can include instructions to determine, using a first attention technique, a first set of similarity measures. For example, the first attention technique can be a cross-attention technique. The first set of similarity measures can be between the feature, from the second image feature set, and members of the set of candidate depths.

With reference to FIG. 6, for example, the first set of similarity measures can be between the first feature 612 and: (1) the corresponding first feature 614, (2) the corresponding first feature 616, and (3) the corresponding first feature 618.

Additionally, in the implementation, the instructions to determine the similarity measure can further include instructions to determine the first set of similarity measures between features, from the second image feature set, and the members of the set of candidate depths.

For example, the first set of similarity measures can be: (1) between the first feature 612 and: (a) the corresponding first feature 614, (b) the corresponding first feature 616, and (c) the corresponding first feature 618, (2) between the second feature 620 and: (a) the corresponding second feature 622, (b) the corresponding second feature 624, and (c) the corresponding second feature 626, (3) between the third feature 628 and: (a) the corresponding third feature 630, (b) the corresponding third feature 632, and (c) the corresponding third feature 634, and (4) between the fourth feature 636 and: (a) the corresponding fourth feature 638, (b) the corresponding fourth feature 640, and (c) the corresponding fourth feature 642.

In a first variation of the implementation, the instructions to determine the similarity measure can further include instructions to divide the features into groups of features. The first set of similarity measures can include, for each group of the groups of features, a corresponding similarity measure.

With reference to FIG. 6, for example, the diagram 600 can further include a first group of features 644 and a second group of features 646. For example: (1) the first group of features 644 can include: (a) the first feature 612, (b) the corresponding first feature 614, (c) the corresponding first feature 616, (d) the corresponding first feature 618, (e) the second feature 620, (f) the corresponding second feature 622, (g) the corresponding second feature 624, and (h) the corresponding second feature 626 and (2) and the second group of features 646 can include: (a) the third feature 628, (b) the corresponding third feature 630, (c) the corresponding third feature 632, (d) the corresponding third feature 634, (e) the fourth feature 636, (f) the corresponding fourth feature 638, (g) the corresponding fourth feature 640, and (h) the corresponding fourth feature 642. For example, the first set of similarity measures can include, for each of the first group of features 644 and the second group of features 646, a corresponding similarity measure.

In an extension of the first variation of the implementation, the instructions to determine the similarity measure can further include instructions to normalize the corresponding similarity measure to produce a matching probability.

In a second variation of the implementation, the instructions to determine the similarity measure can further include instructions to determine, using a second attention technique, a second set of similarity measures. For example, the second attention technique can be a self-attention technique. The second set of similarity measures can be between one member, of the members of the set of candidate depths, and other members of the members of the set of candidate depths.

For example, the second set of similarity measures can be between the corresponding first feature 614 and: (1) the corresponding first feature 616 and (2) the corresponding first feature 618.

In an extension of the second variation of the implementation, the instructions to determine the similarity measure can be performed in iterations. For example, a count of the iterations can be a specific number. An iteration, of the iterations, can include an operation of the instructions to determine, using the first attention technique (e.g., the cross-attention technique), the first set of similarity measures followed by an operation of the instructions to determine, using the second attention technique (e.g., the self-attention technique), the second set of similarity measures. That is, a single iteration can include, for example, both an operation of the first attention technique and an operation of the second attention technique, but the operation of the second attention technique can follow the operation of the first attention technique.

In a further extension of the second variation of the implementation, the instructions to determine the similarity measure can further include an operation of a final iteration. The final iteration can be an operation of the instructions to determine, using the first attention technique (e.g., the cross-attention technique), the first set of similarity measures. That is, the final iteration can, for example, include an operation of the first attention technique, but exclude an operation of the second attention technique.

In a third variation of the implementation, the instructions to determine the similarity measure can further include instructions to produce, from the first set of similarity measures, a cost volume. In a computer vision task performed with a neural network, a cost volume can be results of operations to produce sets of similarity measures for pixels in an image feature set defined by:

(1) a height measured by a count of the pixels, (2) a width measured by a count of the pixels, and (3) a count of the features associated with a pixel. Because information associated with such results can be expressed in three dimensions, the results can be referred to as a cost volume. In the disclosed technologies, the cost volume can be, for example, with respect to the set of feature sets 604 for the set of candidate depths 420. That is, the cost volume can include, for example, the results of the operations to produce the sets of similarity measures associated with the first feature set 606, the second feature set 608, and the third feature set 610. For this reason, the cost volume of the disclosed technologies can be considered, for example, to have a fourth dimension (i.e., members of the set of feature sets 604).

In a fourth variation of the implementation, a set of similarity measures (e.g., the first set of similarity measures, the second set of similarity measures, or a combination of both) can correspond to a set of matching probabilities. The instructions to determine the similarity measure can further include instructions to: (1) determine, from the set of matching probabilities, a most probable member of the set of candidate depths and (2) perform a normalization operation, with a window function centered on the most probable member, to determine a depth for the pixel in the second image. The most probable member can be associated with a highest value of a matching probability among values of the matching probabilities in the set of matching probabilities.

For example, the set of similarity measures can correspond to a set of matching probabilities for the set of feature sets 604 for the set of candidate depths 420. For example, the set of matching probabilities can include: (1) a first matching probability associated with the first feature set 606 (associated with the first member 422 of the set of candidate depths 420), (2) a second matching probability associated with the second feature set 608 (associated with the second member 426 of the set of candidate depths 420), and (3) a third matching probability associated with the third feature set 610 (associated with the third member 428 of the set of candidate depths 420). For example, if the first matching probability is twenty percent, the second matching probability is seventy percent, and the third matching probability is ten percent, then the most probable member can be the second member 426 of the set of candidate depths 420.

Returning to FIG. 5, in an extension of the fourth variation of the implementation, the system 500 can include a neural network (not illustrated). For example, the neural network can be associated with: (1) the instructions to identify the epipolar line, (2) the instructions to produce the first image feature set, (3) the instructions to produce the second image feature set, (4) the instructions to sample the set of candidate depths, (5) the instructions to determine the similarity measure, (6) the instructions to determine the most probable member, (7) the instructions to perform the normalization operation, and (8) the instructions to produce the depth map. For example, the neural network can be trainable in a self-supervised manner based on a difference between values of pixels in the second image and values of pixels in a third image. The third image can be produced by a projection of values of the first image onto a copy of the second image. The projection can be based on predictions of depths associated with pixels in the copy of the second image.

For example, the depth map production module 508 can include instructions that function to control the processor 502 to produce, from the second image, the depth map. In the depth map, the depth for the pixel can be a depth associated with a member, of the set of candidate depths, having a greatest similarity measure. If the set of similarity measures corresponds to the set of matching probabilities, then the greatest similarity measure can include a greatest matching probability.

With reference to FIG. 6, for example, because the second matching probability (i.e., seventy percent) is the greatest similarity measure in the set of matching probabilities, the depth for corresponding pixel 404 in the depth map can be a depth associated with the second member 426 of the set of candidate depths 420.

Returning to FIG. 5, additionally, for example, the depth map production module 508 can further include instructions that function to control the processor 502 to determine, using the depth for the pixel, a distance to the object in the scene.

Figure 7A:
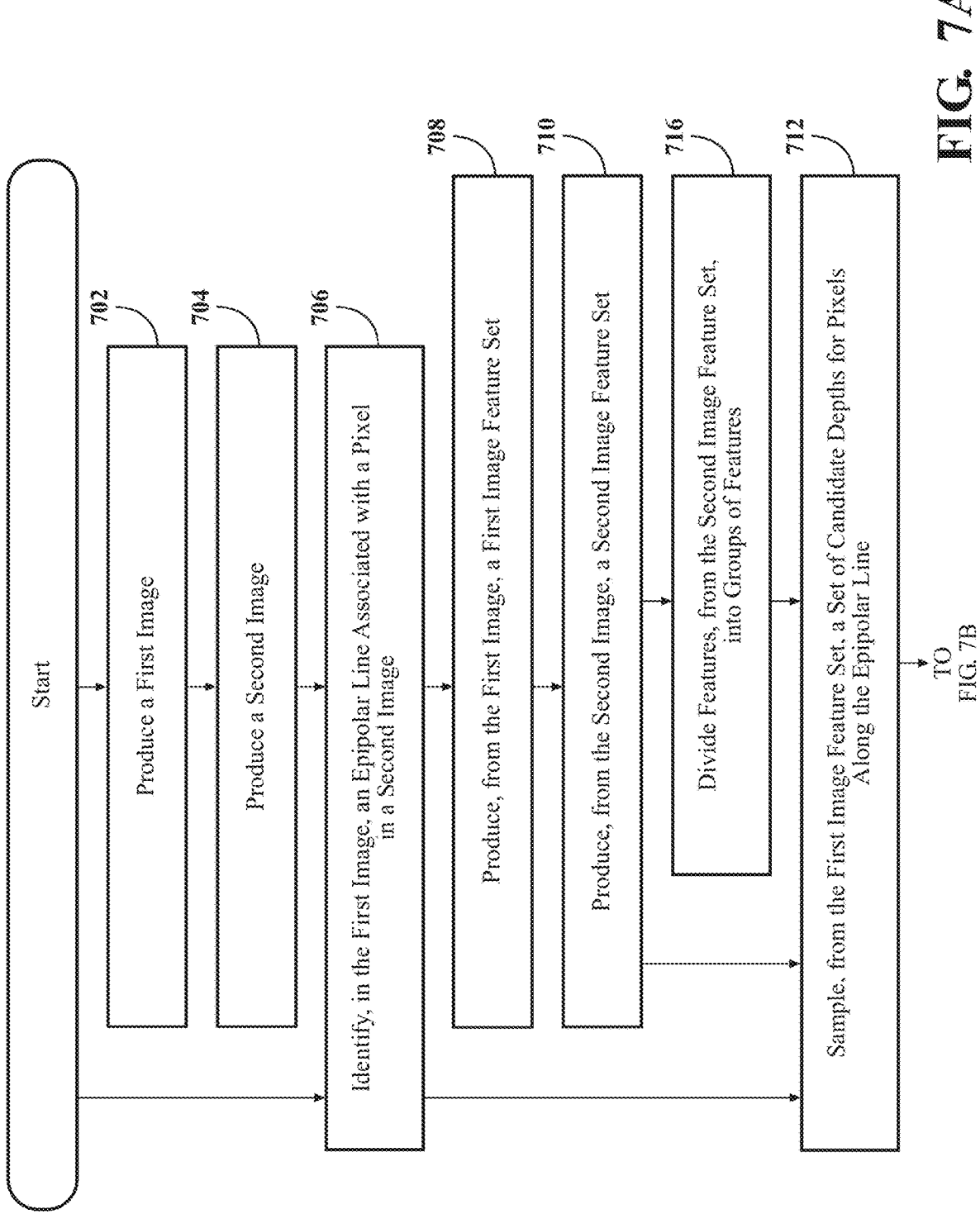

FIGS. 7A and 7B include a flow diagram that illustrates an example of a method 700 that is associated with producing a depth map, according to the disclosed technologies. Although the method 700 is described in combination with the system 500 illustrated in FIG. 5, one of skill in the art understands, in light of the description herein, that the method 700 is not limited to being implemented by the system 500 illustrated in FIG. 5. Rather, the system 500 illustrated in FIG. 5 is an example of a system that may be used to implement the method 700. Additionally, although the method 700 is illustrated as a generally serial process, various aspects of the method 700 may be able to be executed in parallel. For example, operations of the method 700 can be performed by a mobile robot. For example, the mobile robot can include an automated vehicle.

In FIG. 7A, in the method 700, at an operation 702, for example, the camera 510 can produce a first image.

At an operation 704, for example, the camera 510 can produce a second image.

For example, the first image can be of a scene, the second image can be of the scene, and a viewpoint of the second image can be different from a viewpoint of the first image. For example, the camera 510 can include a stereo camera. Alternatively, for example, the first image can be a first frame in a sequence of frames, the second image can be a second frame in the sequence of frames, and the second frame can be separated from the first frame by a duration of time. For example, during the duration of time a position of the camera 510, with respect to an object in the scene, can have changed.

At an operation 706, for example, the candidate depth production module 506 can identify, in the first image, an epipolar line associated with a pixel in the second image. For example, the pixel, in the second image, can represent at least a portion of the object in the scene.

At an operation 708, for example, the candidate depth production module 506 can produce, from the first image, a first image feature set.

At an operation 710, for example, the candidate depth production module 506 can produce, from the second image, a second image feature set.

For example, one or more of the first image or the second image can be defined by: (1) a height measured by a first count of pixels, (2) a width measured by a second count of pixels, and (3) a count of color components represented by the pixel. For example, one or more of the first image feature set or the second image feature set can be defined by: (1) a height measured by a third count of pixels, (2) a width measured by a fourth count of pixels, and (3) a count of features associated with the pixel. Additionally, for example, the third count of pixels can be less than the first count of pixels. Additionally, for example, the fourth count of pixels can be less than the second count of pixels.

At an operation 712, for example, the candidate depth production module 506 can sample, from the first image feature set, a set of candidate depths for pixels along the epipolar line. For example, the set of candidate depths can be defined by: (1) a range of candidate depths from a minimum candidate depth to a maximum candidate depth and (2) a count of members of the set of candidate depths. Additionally, for example, the members of the set of candidate depths can include a first member, a second member, and a third member. For example, the third member can be directly adjacent to the second member. For example, the second member can be directly adjacent to the first member. A first distance can be a distance between the first member and the second member. A second distance can be a distance between the second member and the third member. For example, a relationship between the first distance and the second distance can be a logarithmic relationship.

In FIG. 7B, in the method 700, at an operation 714, for example, the depth map production module 508 can determine a similarity measure between a feature, from the second image feature set, and a member of the set of candidate depths.

In an implementation, the depth map production module 508 can determine, using a first attention technique, a first set of similarity measures. For example, the first attention technique can be a cross-attention technique. The first set of similarity measures can be between the feature, from the second image feature set, and members of the set of candidate depths.

Additionally, in the implementation, the depth map production module 508 can further determine the first set of similarity measures between features, from the second image feature set, and the members of the set of candidate depths.

In FIG. 7A, in the method 700, in a first variation of the implementation, at an operation 716, for example, the depth map production module 508 can divide the features into groups of features. The first set of similarity measures can include, for each group of the groups of features, a corresponding similarity measure.

In FIG. 7B, in the method 700, in an extension of the first variation of the implementation, at an operation 718, for example, the depth map production module 508 can normalize the corresponding similarity measure to produce a matching probability.

In a second variation of the implementation, the depth map production module 508 can further determine, using a second attention technique, a second set of similarity measures. For example, the second attention technique can be a self-attention technique. The second set of similarity measures can be between one member, of the members of the set of candidate depths, and other members of the members of the set of candidate depths.

In an extension of the second variation of the implementation, the depth map production module 508 can determine the similarity measure in iterations. An iteration, of the iterations, can include a determination, using the first attention technique (e.g., the cross-attention technique), of the first set of similarity measures followed by a determination, using the second attention technique (e.g., the self-attention technique), of the second set of similarity measures.

In a further extension of the second variation of the implementation, the depth map production module 508 can further cause an operation of a final iteration. The final iteration can be an operation of the instructions to determine, using the first attention technique (e.g., the cross-attention technique), the first set of similarity measures.

In a third variation of the implementation, at an operation 720, for example, the depth map production module 508 can produce, from the first set of similarity measures, a cost volume.

In a fourth variation of the implementation, a set of similarity measures (e.g., the first set of similarity measures, the second set of similarity measures, or a combination of both) can correspond to a set of matching probabilities.

In the fourth variation of the implementation, at an operation 722, for example, the depth map production module 508 can determine, from the set of matching probabilities, a most probable member of the set of candidate depths. The most probable member can be associated with a highest value of a matching probability among values of the matching probabilities in the set of matching probabilities.

In the fourth variation of the implementation, at an operation 724, for example, the depth map production module 508 can perform a normalization operation, with a window function centered on the most probable member, to determine a depth for the pixel in the second image.

In an extension of the fourth variation of the implementation, a neural network (not illustrated) can be associated with: (1) the operation 706, (2) the operation 708, (3) the operation 710, (4) the operation 712, (5) the operation 714, (6) the operation 722, (7) the operation 724, and (8) an operation 726 to produce the depth map. For example, the neural network can be trainable in a self-supervised manner based on a difference between values of pixels in the second image and values of pixels in a third image. The third image can be produced by a projection of values of the first image onto a copy of the second image. The projection can be based on predictions of depths associated with pixels in the copy of the second image.

At the operation 726, the depth map production module 508 can produce, from the second image, the depth map. In the depth map, the depth for the pixel can be a depth associated with a member, of the set of candidate depths, having a greatest similarity measure. If the set of similarity measures corresponds to the set of matching probabilities, then the greatest similarity measure can include a greatest matching probability.

At an operation 728, the depth map production module 508 can determine, using the depth for the pixel, a distance to the object in the scene.

Figure 8:
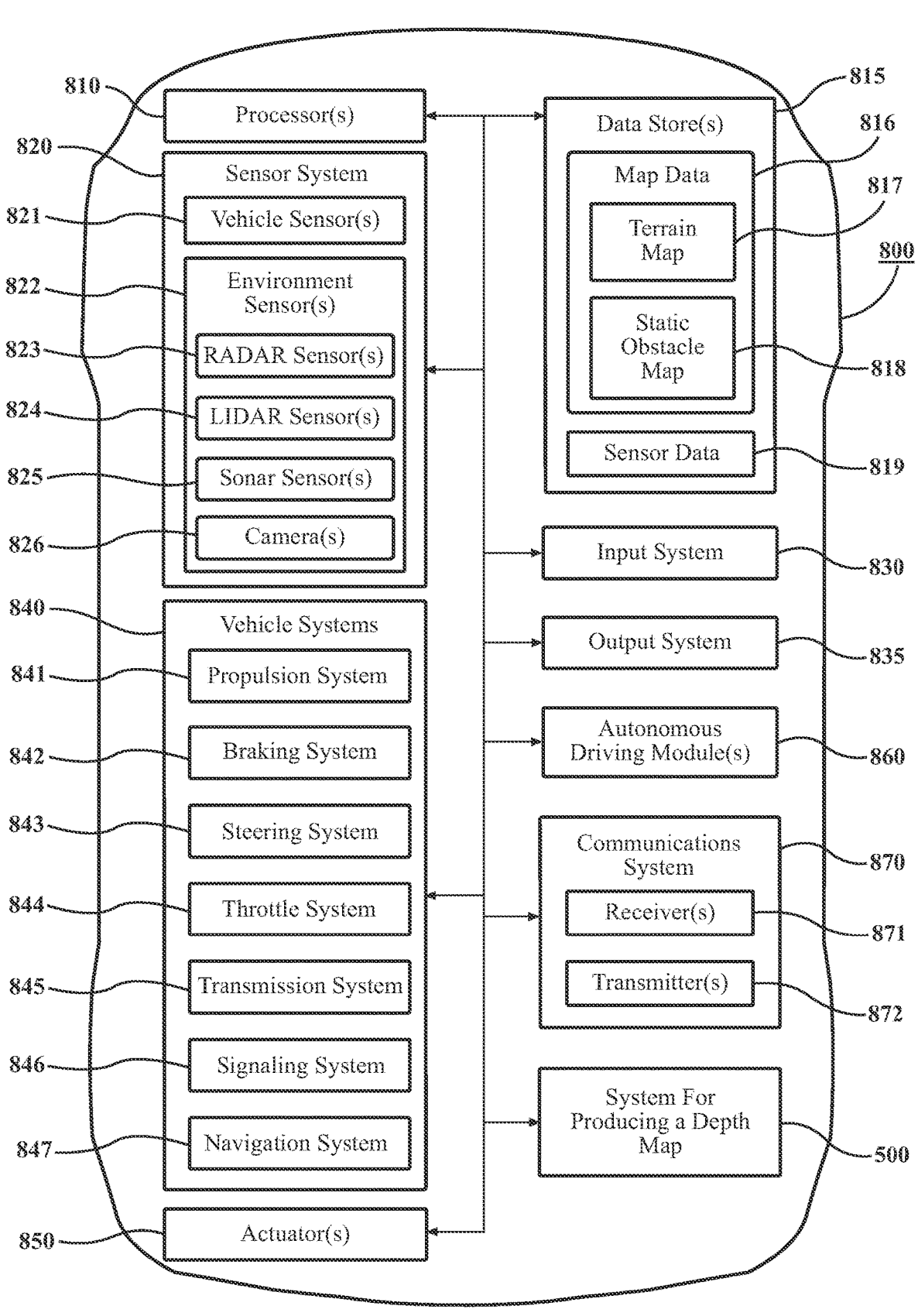
FIG. 8 includes a block diagram that illustrates an example of elements disposed on a vehicle, according to the disclosed technologies.

FIG. 8 includes a block diagram that illustrates an example of elements disposed on a vehicle 800, according to the disclosed technologies. As used herein, a "vehicle" can be any form of powered transport. In one or more implementations, the vehicle 800 can be an automobile. While arrangements described herein are with respect to automobiles, one of skill in the art understands, in light of the description herein, that embodiments are not limited to automobiles.

In some embodiments, the vehicle 800 can be configured to switch selectively between an automated mode, one or more semi-automated operational modes, and/or a manual mode. Such switching can be implemented in a suitable manner, now known or later developed. As used herein, "manual mode" can refer that all of or a majority of the navigation and/or maneuvering of the vehicle 800 is performed according to inputs received from a user (e.g., human driver). In one or more arrangements, the vehicle 800 can be a conventional vehicle that is configured to operate in only a manual mode.

In one or more embodiments, the vehicle 800 can be an automated vehicle. As used herein, "automated vehicle" can refer to a vehicle that operates in an automated mode. As used herein, "automated mode" can refer to navigating and/or maneuvering the vehicle 800 along a travel route using one or more computing systems to control the vehicle 800 with minimal or no input from a human driver. In one or more embodiments, the vehicle 800 can be highly automated or completely automated. In one embodiment, the vehicle 800 can be configured with one or more semi-automated operational modes in which one or more computing systems perform a portion of the navigation and/or maneuvering of the vehicle along a travel route, and a vehicle operator (i.e., driver) provides inputs to the vehicle 800 to perform a portion of the navigation and/or maneuvering of the vehicle 800 along a travel route.

For example, Standard J3016, Taxonomy and Definitions for Terms Related to Driving Automation Systems for On-Road Motor Vehicles, issued by the Society of Automotive Engineers (SAE) International on Jan. 16, 2014, and most recently revised on Jun. 15, 2018, defines six levels of driving automation. These six levels include: (1) level 0, no automation, in which all aspects of dynamic driving tasks are performed by a human driver; (2) level 1, driver assistance, in which a driver assistance system, if selected, can execute, using information about the driving environment, either steering or acceleration/deceleration tasks, but all remaining driving dynamic tasks are performed by a human driver; (3) level 2, partial automation, in which one or more driver assistance systems, if selected, can execute, using information about the driving environment, both steering and acceleration/deceleration tasks, but all remaining driving dynamic tasks are performed by a human driver; (4) level 3, conditional automation, in which an automated driving system, if selected, can execute all aspects of dynamic driving tasks with an expectation that a human driver will respond appropriately to a request to intervene; (5) level 4, high automation, in which an automated driving system, if selected, can execute all aspects of dynamic driving tasks even if a human driver does not respond appropriately to a request to intervene; and (6) level 5, full automation, in which an automated driving system can execute all aspects of dynamic driving tasks under all roadway and environmental conditions that can be managed by a human driver.

The vehicle 800 can include various elements. The vehicle 800 can have any combination of the various elements illustrated in FIG. 8. In various embodiments, it may not be necessary for the vehicle 800 to include all of the elements illustrated in FIG. 8. Furthermore, the vehicle 800 can have elements in addition to those illustrated in FIG. 8. While the various elements are illustrated in FIG. 8 as being located within the vehicle 800, one or more of these elements can be located external to the vehicle 800. Furthermore, the elements illustrated may be physically separated by large distances. For example, as described, one or more components of the disclosed system can be implemented within the vehicle 800 while other components of the system can be implemented within a cloud-computing environment, as described below. For example, the elements can include one or more processors 810, one or more data stores 815, a sensor system 820, an input system 830, an output system 835, vehicle systems 840, one or more actuators 850, one or more automated driving modules 860, a communications system 870, and the system 500 for producing a depth map.

In one or more arrangements, the one or more processors 810 can be a main processor of the vehicle 800. For example, the one or more processors 810 can be an electronic control unit (ECU). For example, functions and/or operations of the processor 502 (illustrated in FIG. 5) can be realized by the one or more processors 810.

The one or more data stores 815 can store, for example, one or more types of data. The one or more data stores 815 can include volatile memory and/or non-volatile memory. For example, functions and/or operations of the memory 504 (illustrated in FIG. 5) can be realized by the one or more data stores 815. Examples of suitable memory for the one or more data stores 815 can include Random-Access Memory (RAM), flash memory, Read-Only Memory (ROM), Programmable Read-Only Memory (PROM), Erasable Programmable Read-Only Memory (EPROM), Electrically Erasable Programmable Read-Only Memory (EEPROM), registers, magnetic disks, optical disks, hard drives, any other suitable storage medium, or any combination thereof. The one or more data stores 815 can be a component of the one or more processors 810. Additionally or alternatively, the one or more data stores 815 can be operatively connected to the one or more processors 810 for use thereby. As used herein, "operatively connected" can include direct or indirect connections, including connections without direct physical contact. As used herein, a statement that a component can be "configured to" perform an operation can be understood to mean that the component requires no structural alterations, but merely needs to be placed into an operational state (e.g., be provided with electrical power, have an underlying operating system running, etc.) in order to perform the operation.

In one or more arrangements, the one or more data stores 815 can store map data 816. The map data 816 can include maps of one or more geographic areas. In some instances, the map data 816 can include information or data on roads, traffic control devices, road markings, structures, features, and/or landmarks in the one or more geographic areas. The map data 816 can be in any suitable form. In some instances, the map data 816 can include aerial views of an area. In some instances, the map data 816 can include ground views of an area, including 360-degree ground views. The map data 816 can include measurements, dimensions, distances, and/or information for one or more items included in the map data 816 and/or relative to other items included in the map data 816. The map data 816 can include a digital map with information about road geometry. The map data 816 can be high quality and/or highly detailed.

In one or more arrangements, the map data 816 can include one or more terrain maps 817. The one or more terrain maps 817 can include information about the ground, terrain, roads, surfaces, and/or other features of one or more geographic areas. The one or more terrain maps 817 can include elevation data of the one or more geographic areas. The map data 816 can be high quality and/or highly detailed. The one or more terrain maps 817 can define one or more ground surfaces, which can include paved roads, unpaved roads, land, and other things that define a ground surface.

In one or more arrangements, the map data 816 can include one or more static obstacle maps 818. The one or more static obstacle maps 818 can include information about one or more static obstacles located within one or more geographic areas. A "static obstacle" can be a physical object whose position does not change (or does not substantially change) over a period of time and/or whose size does not change (or does not substantially change) over a period of time. Examples of static obstacles can include trees, buildings, curbs, fences, railings, medians, utility poles, statues, monuments, signs, benches, furniture, mailboxes, large rocks, and hills. The static obstacles can be objects that extend above ground level. The one or more static obstacles included in the one or more static obstacle maps 818 can have location data, size data, dimension data, material data, and/or other data associated with them. The one or more static obstacle maps 818 can include measurements, dimensions, distances, and/or information for one or more static obstacles. The one or more static obstacle maps 818 can be high quality and/or highly detailed. The one or more static obstacle maps 818 can be updated to reflect changes within a mapped area.

In one or more arrangements, the one or more data stores 815 can store sensor data 819. As used herein, "sensor data" can refer to any information about the sensors with which the vehicle 800 can be equipped including the capabilities of and other information about such sensors. The sensor data 819 can relate to one or more sensors of the sensor system 820. For example, in one or more arrangements, the sensor data 819 can include information about one or more lidar sensors 824 of the sensor system 820.

In some arrangements, at least a portion of the map data 816 and/or the sensor data 819 can be located in one or more data stores 815 that are located onboard the vehicle 800. Alternatively or additionally, at least a portion of the map data 816 and/or the sensor data 819 can be located in one or more data stores 815 that are located remotely from the vehicle 800.

The sensor system 820 can include one or more sensors. As used herein, a "sensor" can refer to any device, component, and/or system that can detect and/or sense something. The one or more sensors can be configured to detect and/or sense in real-time. As used herein, the term "real-time" can refer to a level of processing responsiveness that is perceived by a user or system to be sufficiently immediate for a particular process or determination to be made, or that enables the processor to keep pace with some external process.

In arrangements in which the sensor system 820 includes a plurality of sensors, the sensors can work independently from each other. Alternatively, two or more of the sensors can work in combination with each other. In such a case, the two or more sensors can form a sensor network. The sensor system 820 and/or the one or more sensors can be operatively connected to the one or more processors 810, the one or more data stores 815, and/or another element of the vehicle 800 (including any of the elements illustrated in FIG. 8). The sensor system 820 can acquire data of at least a portion of the external environment of the vehicle 800 (e.g., nearby vehicles). The sensor system 820 can include any suitable type of sensor. Various examples of different types of sensors are described herein. However, one of skill in the art understands that the embodiments are not limited to the particular sensors described herein.

The sensor system 820 can include one or more vehicle sensors 821. The one or more vehicle sensors 821 can detect, determine, and/or sense information about the vehicle 800 itself. In one or more arrangements, the one or more vehicle sensors 821 can be configured to detect and/or sense position and orientation changes of the vehicle 800 such as, for example, based on inertial acceleration. In one or more arrangements, the one or more vehicle sensors 821 can include one or more accelerometers, one or more gyroscopes, an inertial measurement unit (IMU), a dead-reckoning system, a global navigation satellite system (GNSS), a global positioning system (GPS), a navigation system 847, and/or other suitable sensors. The one or more vehicle sensors 821 can be configured to detect and/or sense one or more characteristics of the vehicle 800. In one or more arrangements, the one or more vehicle sensors 821 can include a speedometer to determine a current speed of the vehicle 800.

Alternatively or additionally, the sensor system 820 can include one or more environment sensors 822 configured to acquire and/or sense driving environment data. As used herein, "driving environment data" can include data or information about the external environment in which a vehicle is located or one or more portions thereof. For example, the one or more environment sensors 822 can be configured to detect, quantify, and/or sense obstacles in at least a portion of the external environment of the vehicle 800 and/or information/data about such obstacles. Such obstacles may be stationary objects and/or dynamic objects. The one or more environment sensors 822 can be configured to detect, measure, quantify, and/or sense other things in the external environment of the vehicle 800 such as, for example, lane markers, signs, traffic lights, traffic signs, lane lines, crosswalks, curbs proximate the vehicle 800, off-road objects, etc.

Various examples of sensors of the sensor system 820 are described herein. The example sensors may be part of the one or more vehicle sensors 821 and/or the one or more environment sensors 822. However, one of skill in the art understands that the embodiments are not limited to the particular sensors described.

In one or more arrangements, the one or more environment sensors 822 can include one or more radar sensors 823, one or more lidar sensors 824, one or more sonar sensors 825, and/or one more cameras 826. In one or more arrangements, the one or more cameras 826 can be one or more high dynamic range (HDR) cameras or one or more infrared (IR) cameras. For example, the one or more cameras 826 can be used to record a reality of a state of an item of information that can appear in the digital map.

The input system 830 can include any device, component, system, element, arrangement, or groups thereof that enable information/data to be entered into a machine. The input system 830 can receive an input from a vehicle passenger (e.g., a driver or a passenger). The output system 835 can include any device, component, system, element, arrangement, or groups thereof that enable information/data to be presented to a vehicle passenger (e.g., a driver or a passenger).

Various examples of the one or more vehicle systems 840 are illustrated in FIG. 8. However, one of skill in the art understands that the vehicle 800 can include more, fewer, or different vehicle systems. Although particular vehicle systems can be separately defined, each or any of the systems or portions thereof may be otherwise combined or segregated via hardware and/or software within the vehicle 800. For example, the one or more vehicle systems 840 can include a propulsion system 841, a braking system 842, a steering system 843, a throttle system 844, a transmission system 845, a signaling system 846, and/or the navigation system 847. Each of these systems can include one or more devices, components, and/or a combination thereof, now known or later developed.

The navigation system 847 can include one or more devices, applications, and/or combinations thereof, now known or later developed, configured to determine the geographic location of the vehicle 800 and/or to determine a travel route for the vehicle 800. The navigation system 847 can include one or more mapping applications to determine a travel route for the vehicle 800. The navigation system 847 can include a global positioning system, a local positioning system, a geolocation system, and/or a combination thereof.

The one or more actuators 850 can be any element or combination of elements operable to modify, adjust, and/or alter one or more of the vehicle systems 840 or components thereof responsive to receiving signals or other inputs from the one or more processors 810 and/or the one or more automated driving modules 860. Any suitable actuator can be used. For example, the one or more actuators 850 can include motors, pneumatic actuators, hydraulic pistons, relays, solenoids, and/or piezoelectric actuators.

The one or more processors 810 and/or the one or more automated driving modules 860 can be operatively connected to communicate with the various vehicle systems 840 and/or individual components thereof. For example, the one or more processors 810 and/or the one or more automated driving modules 860 can be in communication to send and/or receive information from the various vehicle systems 840 to control the movement, speed, maneuvering, heading, direction, etc. of the vehicle 800. The one or more processors 810 and/or the one or more automated driving modules 860 may control some or all of these vehicle systems 840 and, thus, may be partially or fully automated.

The one or more processors 810 and/or the one or more automated driving modules 860 may be operable to control the navigation and/or maneuvering of the vehicle 800 by controlling one or more of the vehicle systems 840 and/or components thereof. For example, when operating in an automated mode, the one or more processors 810 and/or the one or more automated driving modules 860 can control the direction and/or speed of the vehicle 800. The one or more processors 810 and/or the one or more automated driving modules 860 can cause the vehicle 800 to accelerate (e.g., by increasing the supply of fuel provided to the engine), decelerate (e.g., by decreasing the supply of fuel to the engine and/or by applying brakes) and/or change direction (e.g., by turning the front two wheels). As used herein, "cause" or "causing" can mean to make, force, compel, direct, command, instruct, and/or enable an event or action to occur or at least be in a state where such event or action may occur, either in a direct or indirect manner.

The communications system 870 can include one or more receivers 871 and/or one or more transmitters 872. The communications system 870 can receive and transmit one or more messages through one or more wireless communications channels. For example, the one or more wireless communications channels can be in accordance with the Institute of Electrical and Electronics Engineers (IEEE) 802.11p standard to add wireless access in vehicular environments (WAVE) (the basis for Dedicated Short-Range Communications (DSRC)), the 3rd Generation Partnership Project (3GPP) Long-Term Evolution (LTE) Vehicle-to-Everything (V2X) (LTE-V2X) standard (including the LTE Uu interface between a mobile communication device and an Evolved Node B of the Universal Mobile Telecommunications System), the 3GPP fifth generation (5G) New Radio (NR) Vehicle-to-Everything (V2X) standard (including the 5G NR Uu interface), or the like. For example, the communications system 870 can include "connected vehicle" technology. "Connected vehicle" technology can include, for example, devices to exchange communications between a vehicle and other devices in a packet-switched network. Such other devices can include, for example, another vehicle (e.g., "Vehicle to Vehicle" (V2V) technology), roadside infrastructure (e.g., "Vehicle to Infrastructure" (V2I) technology), a cloud platform (e.g., "Vehicle to Cloud" (V2C) technology), a pedestrian (e.g., "Vehicle to Pedestrian" (V2P) technology), or a network (e.g., "Vehicle to Network" (V2N) technology. "Vehicle to Everything" (V2X) technology can integrate aspects of these individual communications technologies.

Moreover, the one or more processors 810, the one or more data stores 815, and the communications system 870 can be configured to one or more of form a micro cloud, participate as a member of a micro cloud, or perform a function of a leader of a mobile micro cloud. A micro cloud can be characterized by a distribution, among members of the micro cloud, of one or more of one or more computing resources or one or more data storage resources in order to collaborate on executing operations. The members can include at least connected vehicles.

The vehicle 800 can include one or more modules, at least some of which are described herein. The modules can be implemented as computer-readable program code that, when executed by the one or more processors 810, implement one or more of the various processes described herein. One or more of the modules can be a component of the one or more processors 810. Alternatively or additionally, one or more of the modules can be executed on and/or distributed among other processing systems to which the one or more processors 810 can be operatively connected. The modules can include instructions (e.g., program logic) executable by the one or more processors 810. Alternatively or additionally, the one or more data store 815 may contain such instructions.

In one or more arrangements, one or more of the modules described herein can include artificial or computational intelligence elements, e.g., neural network, fuzzy logic, or other machine learning algorithms. Further, in one or more arrangements, one or more of the modules can be distributed among a plurality of the modules described herein. In one or more arrangements, two or more of the modules described herein can be combined into a single module.

The vehicle 800 can include one or more automated driving modules 860. The one or more automated driving modules 860 can be configured to receive data from the sensor system 820 and/or any other type of system capable of capturing information relating to the vehicle 800 and/or the external environment of the vehicle 800. In one or more arrangements, the one or more automated driving modules 860 can use such data to generate one or more driving scene models. The one or more automated driving modules 860 can determine position and velocity of the vehicle 800. The one or more automated driving modules 860 can determine the location of obstacles, obstacles, or other environmental features including traffic signs, trees, shrubs, neighboring vehicles, pedestrians, etc.

The one or more automated driving modules 860 can be configured to receive and/or determine location information for obstacles within the external environment of the vehicle 800 for use by the one or more processors 810 and/or one or more of the modules described herein to estimate position and orientation of the vehicle 800, vehicle position in global coordinates based on signals from a plurality of satellites, or any other data and/or signals that could be used to determine the current state of the vehicle 800 or determine the position of the vehicle 800 with respect to its environment for use in either creating a map or determining the position of the vehicle 800 in respect to map data.

The one or more automated driving modules 860 can be configured to determine one or more travel paths, current automated driving maneuvers for the vehicle 800, future automated driving maneuvers and/or modifications to current automated driving maneuvers based on data acquired by the sensor system 820, driving scene models, and/or data from any other suitable source such as determinations from the sensor data 819. As used herein, "driving maneuver" can refer to one or more actions that affect the movement of a vehicle. Examples of driving maneuvers include: accelerating, decelerating, braking, turning, moving in a lateral direction of the vehicle 800, changing travel lanes, merging into a travel lane, and/or reversing, just to name a few possibilities. The one or more automated driving modules 860 can be configured to implement determined driving maneuvers. The one or more automated driving modules 860 can cause, directly or indirectly, such automated driving maneuvers to be implemented. As used herein, "cause" or "causing" means to make, command, instruct, and/or enable an event or action to occur or at least be in a state where such event or action may occur, either in a direct or indirect manner. The one or more automated driving modules 860 can be configured to execute various vehicle functions and/or to transmit data to, receive data from, interact with, and/or control the vehicle 800 or one or more systems thereof (e.g., one or more of vehicle systems 840). For example, functions and/or operations of an automotive navigation system can be realized by the one or more automated driving modules 860.

Detailed embodiments are disclosed herein. However, one of skill in the art understands, in light of the description herein, that the disclosed embodiments are intended only as examples. Therefore, specific structural and functional details disclosed herein are not to be interpreted as limiting, but merely as a basis for the claims and as a representative basis for teaching one of skill in the art to variously employ the aspects herein in virtually any appropriately detailed structure. Furthermore, the terms and phrases used herein are not intended to be limiting but rather to provide an understandable description of possible implementations. Various embodiments are illustrated in FIGS. 1-6, 7A, 7B, and 8, but the embodiments are not limited to the illustrated structure or application.

The flowchart and block diagrams in the figures illustrate the architecture, functionality, and operation of possible implementations of systems, methods, and computer program products according to various embodiments. In this regard, each block in flowcharts or block diagrams may represent a module, segment, or portion of code, which comprises one or more executable instructions for implementing the specified logical function(s). One of skill in the art understands, in light of the description herein, that, in some alternative implementations, the functions described in a block may occur out of the order depicted by the figures. For example, two blocks depicted in succession may, in fact, be executed substantially concurrently, or the blocks may be executed in the reverse order, depending upon the functionality involved.

The systems, components and/or processes described above can be realized in hardware or a combination of hardware and software and can be realized in a centralized fashion in one processing system or in a distributed fashion where different elements are spread across several interconnected processing systems. Any kind of processing system or another apparatus adapted for carrying out the methods described herein is suitable. A typical combination of hardware and software can be a processing system with computer-readable program code that, when loaded and executed, controls the processing system such that it carries out the methods described herein. The systems, components, and/or processes also can be embedded in a computer-readable storage, such as a computer program product or other data programs storage device, readable by a machine, tangibly embodying a program of instructions executable by the machine to perform methods and processes described herein. These elements also can be embedded in an application product that comprises all the features enabling the implementation of the methods described herein and that, when loaded in a processing system, is able to carry out these methods.

Furthermore, arrangements described herein may take the form of a computer program product embodied in one or more computer-readable media having computer-readable program code embodied, e.g., stored, thereon. Any combination of one or more computer-readable media may be utilized. The computer-readable medium may be a computer-readable signal medium or a computer-readable storage medium. As used herein, the phrase "computer-readable storage medium" means a non-transitory storage medium. A computer-readable storage medium may be, for example, but not limited to, an electronic, magnetic, optical, electromagnetic, infrared, or semiconductor system, apparatus, or device, or any suitable combination of the foregoing. More specific examples of the computer-readable storage medium would include, in a non-exhaustive list, the following: a portable computer diskette, a hard disk drive (HDD), a solid-state drive (SSD), a read-only memory (ROM), an erasable programmable read-only memory (EPROM or flash memory), a portable compact disc read-only memory (CD-ROM), a digital versatile disc (DVD), an optical storage device, a magnetic storage device, or any suitable combination of the foregoing. As used herein, a computer-readable storage medium may be any tangible medium that can contain or store a program for use by or in connection with an instruction execution system, apparatus, or device.

Generally, modules, as used herein, include routines, programs, objects, components, data structures, and so on that perform particular tasks or implement particular data types. In further aspects, a memory generally stores such modules. The memory associated with a module may be a buffer or may be cache embedded within a processor, a random-access memory (RAM), a ROM, a flash memory, or another suitable electronic storage medium. In still further aspects, a module as used herein, may be implemented as an application-specific integrated circuit (ASIC), a hardware component of a system on a chip (SoC), a programmable logic array (PLA), or another suitable hardware component that is embedded with a defined configuration set (e.g., instructions) for performing the disclosed functions.

Program code embodied on a computer-readable medium may be transmitted using any appropriate medium, including but not limited to wireless, wireline, optical fiber, cable, radio frequency (RF), etc., or any suitable combination of the foregoing. Computer program code for carrying out operations for aspects of the disclosed technologies may be written in any combination of one or more programming languages, including an object-oriented programming language such as Java™, Smalltalk, C++, or the like, and conventional procedural programming languages such as the "C" programming language or similar programming languages. The program code may execute entirely on a user's computer, partly on a user's computer, as a stand-alone software package, partly on a user's computer and partly on a remote computer, or entirely on a remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising (i.e., open language). The phrase "at least one of . . . or . . . " as used herein refers to and encompasses any and all possible combinations of one or more of the associated listed items. For example, the phrase "at least one of A, B, or C" includes A only, B only, C only, or any combination thereof (e.g., AB, AC, BC, or ABC).

Aspects herein can be embodied in other forms without departing from the spirit or essential attributes thereof. Accordingly, reference should be made to the following claims, rather than to the foregoing specification, as indicating the scope hereof.

What is claimed is:

1. A system, comprising:
a processor; and
a memory storing:
    a candidate depth production module including instruc-
        tions that, when executed by the processor, cause the
        processor to:
        identify, in a first image, an epipolar line associated
           with a pixel in a second image; and
        sample, from a first image feature set, a set of
           candidate depths for pixels along the epipolar line,
           a relationship between a first distance, of a first
           pair of adjacent members of the set, and a second
           distance, of a second pair of adjacent members of
           the set, being a logarithmic relationship; and
    a depth map production module including instructions
        that, when executed by the processor, cause the
        processor to:
        determine a similarity measure between a feature,
           from a second image feature set, and a member of
           the set; and
        produce, from the second image, a depth map with a
           depth for the pixel being a depth associated with
           a member, of the set, having a greatest similarity
           measure.

2. The system of claim 1, wherein:
the second image is of a scene,
the pixel, in the second image, represents at least a portion
    of an object in the scene, and
the depth map production module further includes instruc-
    tions to determine, using the depth for the pixel, a
    distance to the object.

3. The system of claim 1, further comprising a camera
configured to:
produce the first image; and
produce the second image.

4. The system of claim 3, wherein the camera comprises
a stereo camera.

5. The system of claim 1, wherein:
at least one of the first image or the second image is
    defined by:
    a height measured by a first count of pixels,
    a width measured by a second count of pixels, and
    a count of color components represented by the pixel,
at least one of the first image feature set or the second
    image feature set is defined by:
    a height measured by a third count of pixels,
    a width measured by a fourth count of pixels, and
    a count of features associated with the pixel, and
at least one of:
    the third count of pixels is less than the first count of
        pixels, or
    the fourth count of pixels is less than the second count
        of pixels.

6. The system of claim 1, wherein:
the set of candidate depths is defined by:
    a range of candidate depths from a minimum candidate
        depth to a maximum candidate depth, and
    a count of members of the set of candidate depths,
the members of the set of candidate depths include a first
    member, a second member, and a third member, the
    third member being directly adjacent to the second
    member, and the second member being directly adja-
    cent to the first member, and
the relationship between the first distance and the second
    distance is the logarithmic relationship, the first dis-
    tance being a distance between the first member and the second member, the second distance being a distance
    between the second member and the third member.

7. The system of claim 1, wherein the depth map produc-
tion module further includes instructions to:
produce, from the first image, the first image feature set;
    and
produce, from the second image, the second image feature
    set.

8. The system of claim 7, wherein the instructions to
determine the similarity measure include instructions to
determine, using a first attention technique, a first set of
similarity measures, the first set of similarity measures being
between the feature, from the second image feature set, and
members of the set of candidate depths.

9. The system of claim 8, wherein the instructions to
determine the similarity measure further include instructions
to determine the first set of similarity measures between
features, from the second image feature set, and the mem-
bers of the set of candidate depths.

10. The system of claim 9, wherein:
the instructions to determine the similarity measure fur-
    ther include instructions to divide the features into
    groups of features, and
the first set of similarity measures comprises, for each
    group of the groups of features, a corresponding simi-
    larity measure.

11. The system of claim 10, wherein:
the instructions to determine the similarity measure fur-
    ther include instructions to normalize the correspond-
    ing similarity measure to produce a matching probabil-
    ity, and
the greatest similarity measure comprises a greatest
    matching probability.

12. The system of claim 8, wherein instructions to deter-
mine the similarity measure further include instructions to
determine, using a second attention technique, a second set
of similarity measures, the second set of similarity measures
being between one member, of the members of the set of
candidate depths, and other members of the members of the
set of candidate depths.

13. The system of claim 12, wherein:
the instructions to determine the similarity measure are
    performed in iterations, an iteration, of the iterations,
    comprising an operation of the instructions to deter-
    mine, using the first attention technique, the first set of
    similarity measures followed by an operation of the
    instructions to determine, using the second attention
    technique, the second set of similarity measures, and
the instructions to determine the similarity measure fur-
    ther include an operation of a final iteration, the final
    iteration being an operation of the instructions to deter-
    mine, using the first attention technique, the first set of
    similarity measures.

14. The system of claim 8, wherein the instructions to
determine the similarity measure further include instructions
to produce, from the first set of similarity measures, a cost
volume.

15. The system of claim 8, wherein:
the first set of similarity measures corresponds to a set of
    matching probabilities, and
the instructions to determine the similarity measure fur-
    ther include instructions to:
    determine, from the set of matching probabilities, a
        most probable member of the set of candidate
        depths, the most probable member being associated
        with a highest value of a matching probability among values of the matching probabilities in the set of matching probabilities; and perform a normalization operation, with a window function centered on the most probable member, to determine the depth for the pixel.

16. The system of claim 15, wherein:

the system includes a neural network, the neural network is associated with the instructions to identify the epipolar line, the instructions to produce the first image feature set, the instructions to produce the second image feature set, the instructions to sample the set of candidate depths, the instructions to determine the similarity measure, the instructions to determine the most probable member, the instructions to perform the normalization operation, and the instructions to produce the depth map, the neural network is trainable in a self-supervised manner based on a difference between values of pixels in the second image and values of pixels in a third image, the third image is produced by a projection of values of the first image onto a copy of the second image, and the projection is based on predictions of depths associated with pixels in the copy of the second image.

17. A method, comprising:

identifying, by a processor, in a first image, an epipolar line associated with a pixel in a second image;

sampling, by the processor and from a first image feature set, a set of candidate depths for pixels along the epipolar line, a relationship between a first distance, of a first pair of adjacent members of the set, and a second distance, of a second pair of adjacent members of the set, being a logarithmic relationship;

determining, by the processor, a similarity measure between a feature, from a second image feature set, and a member of the set; and producing, by the processor and from the second image, a depth map with a depth for the pixel being a depth associated with a member, of the set, having a greatest similarity measure.

18. The method of claim 17, wherein:

the first image is of a scene, the second image is of the scene, and a viewpoint of the second image is different from a viewpoint of the first image.

19. The method of claim 17, wherein:

the first image is a first frame in a sequence of frames, the second image is a second frame in the sequence of frames, and the second frame is separated from the first frame by a duration of time.

20. A non-transitory computer-readable medium for producing a depth map, the non-transitory computer-readable medium including instructions that, when executed by one or more processors, cause the one or more processors to:

identify, in a first image, an epipolar line associated with a pixel in a second image;

sample, from a first image feature set, a set of candidate depths for pixels along the epipolar line, a relationship between a first distance, of a first pair of adjacent members of the set, and a second distance, of a second pair of adjacent members of the set, being a logarithmic relationship;

determine a similarity measure between a feature, from a second image feature set, and a member of the set; and produce, from the second image, the depth map with a depth for the pixel being a depth associated with a member, of the set, having a greatest similarity measure.

* * * * *